(12) United States Patent
Okamura et al.

(10) Patent No.: US 6,715,700 B2
(45) Date of Patent: Apr. 6, 2004

(54) SOLENOID VALVE

(75) Inventors: Koichi Okamura, Itami (JP); Keita Nakano, Itami (JP)

(73) Assignee: Sumitomo (SEI) Brake Systems, Inc., Hisai (JP)

( * ) Notice: Subject to any disclaimer, the term of this patent is extended or adjusted under 35 U.S.C. 154(b) by 0 days.

(21) Appl. No.: 10/118,077

(22) Filed: Apr. 9, 2002

(65) Prior Publication Data
US 2003/0015676 A1 Jan. 23, 2003

(30) Foreign Application Priority Data
Apr. 26, 2001 (JP) .................................. 2001-129454

(51) Int. Cl.⁷ .............................................. F16K 31/02
(52) U.S. Cl. .............................. 239/585.4; 251/129.15; 251/333; 239/585.1; 303/119.2
(58) Field of Search ................. 251/129.02, 129.15, 251/333; 303/119.2; 239/533.7, 585.1, 585.4, 585.5

(56) References Cited

U.S. PATENT DOCUMENTS

| | | | | |
|---|---|---|---|---|
| 4,944,328 A | * | 7/1990 | Brundage | 251/129.02 |
| 5,388,899 A | * | 2/1995 | Volz et al. | 303/119.2 |
| 5,556,175 A | * | 9/1996 | Hayakawa et al. | 251/129.02 |
| 5,564,799 A | | 10/1996 | Fujimoto et al. | |
| 5,577,815 A | | 11/1996 | Hashida | |
| 5,609,400 A | | 3/1997 | Hashida | |
| 6,086,165 A | | 7/2000 | Fujioka et al. | |
| 6,471,305 B1 | * | 10/2002 | Leventhal et al. | 251/129.02 |

* cited by examiner

Primary Examiner—John Bastianelli
(74) Attorney, Agent, or Firm—Greenblum & Bernstein, P.L.C.

(57) ABSTRACT

A poppet type solenoid valve used in an electronically controllable vehicle hydraulic brake system is proposed which suppresses sound and vibration and simultaneously eliminates malfunction.

For these effects, the following conditions have to be satisfied:

$$F_{SP}/(r^2-B^2)<67 \quad (1)$$

$$F_{SP} \cdot St^2/(r^2-B^2)>29 \quad (2)$$

wherein $F_{SP}$ is the force of the spring, r is the tip diameter of the poppet, St is the stroke of the poppet, and B is the diameter of the area of the poppet where the valve-opening force by hydraulic pressure does not work on the poppet under the Bernoulli effect.

4 Claims, 3 Drawing Sheets

SOLENOID VALVE

BACKGROUND OF THE INVENTION

This invention relates to a solenoid valve used in an electronically controlled vehicle hydraulic brake system. More particularly, it relates to a solenoid valve which suppresses sound and vibration produced during operation and which scarcely malfunctions.

FIG. 2 shows an example of an electronically controlled vehicle hydraulic brake system. It is designed for antilock control. When the driver depresses the brake pedal 1, the force is amplified by a booster 2, a master cylinder 3 is actuated by the force, so that pressurized brake fluid is supplied to wheel cylinders 4, thereby producing braking force.

In a flow passage from the master cylinder 3 to the wheel cylinders 4, normally open solenoid valves 5 are provided. Also, between the wheel cylinders 4 and low-pressure fluid reservoirs 6, normally closed solenoid valves 7 are provided. Further, there are provided motor-driven pumps 8 for sucking brake fluid in the low-pressure fluid reservoirs 6 and returning it to a flow passage upstream of the solenoid valves 5 (i.e. master cylinder side), and orifices 9 for suppressing pulsation of the fluid discharged from the pump.

In such a brake system, if an electronic control unit (not shown) detects a sign of wheel locking based on information from e.g. a wheel speed sensor (not shown), it will give a command to close the solenoid valve 5 and open the solenoid valve 7 in the line to which the wheel belongs, thereby reducing the pressure of the wheel cylinder 4. Also, when the electronic control unit determines that as a result of the pressure reduction, the system is showing a tendency to recover from wheel locking, the solenoid valves 5 and 7 are opened and closed, respectively. Brake fluid sucked up by the pump 8 is supplied to the wheel cylinder 4 to reincrease pressure. By repeating this operation, wheel locking is avoided.

FIG. 3 shows a specific example of a solenoid valve 5 employed in the hydraulic brake system of FIG. 2. It comprises a frame 51, a poppet 52 mounted in a bore of the frame, an orifice 54 having a valve seat 53, a spring 55, a solenoid 56 for applying a valve-closing force to the poppet 52, and a housing 57 coupled to the frame 51. When the coil 56a of the solenoid 56 is energized, a movable core 56b integral with the rear end of the poppet 52 is attracted toward the frame 51 by a magnetic force produced, so that the poppet 52 contacts the valve seat 53, which is provided at a mouth portion of the orifice 54, thereby closing the valve.

Also, when the solenoid 56 is demagnetized, the poppet 52 will move away from the valve seat 53 under the force of the spring 55, so that the valve opens. Brake fluid flows from an input port 59 through the orifice 54, and then through an open passage between the valve seat 53 and the poppet 52 into an output port 58.

With a solenoid valve in which the flow passage is opened and closed by a poppet, when the valve is closed, the poppet 52 collides against the valve seat, and when the valve is opened, the movable core 56b collides against the housing 57. Thus operating sounds are big.

Also, since changes in the degree of opening of the flow passage with the movement of the poppet are large, brake fluid pulsates during opening and closing. This increases vibration inflicted on the vehicle.

An object of this invention is to suppress sound and vibration and to eliminate malfunction of solenoid valves.

SUMMARY OF THE INVENTION

According to this invention, there is provided a solenoid valve comprising a poppet, an orifice, a valve seat provided at a mouth portion of the orifice, a solenoid for bringing the tip of the poppet into contact with the valve seat by applying a valve-closing force to the poppet, and a spring for applying a force in a valve-opening direction to the poppet, whereby a flow passage around the valve seat is opened and closed by the poppet and the fluid to be controlled is allowed to flow through the valve while the valve is open, characterized in that the following conditions are satisfied, $$F_{SP}/(r^2-B^2)<67 \quad (1)$$

$$F_{SP} \cdot St^2/(r^2-B^2)>29 \quad (2)$$

wherein $F_{SP}$ is the force of the spring, r is the tip diameter of the poppet, St is the stroke of the poppet, and B is the diameter of the area of the poppet where the valve-opening force by hydraulic pressure does not work on the poppet under the Bernoulli effect.

With such a solenoid valve in which the poppet tip diameter is 1.2 to 1.8 mm, the orifice diameter is 0.7 mm, and the angle of the seat surface of the valve seat is 120°, if the spring force $F_{SP}$ and the poppet stroke St are so set as to satisfy the above formulas with the value of B set at 1.1 mm, better results are obtained.

More preferably, the following conditions $$F_{SP}/(r^2-B^2)<48$$

$$F_{SP} \cdot St^2/(r^2-B^2)>40$$

are both satisfied.

With the solenoid valve of this invention, when the valve is opened during hydraulic pressure control, poppet suction force will be generated due to the Bernoulli effect, so that the poppet is kept in a half-open position. This restrict sharp movement of brake fluid, so that pulsation during opening and closing of the valve decreases. Also, since the poppet stops at a half-open position, impulsive collision of the movable core against the housing and impulsive collision of the poppet against the valve seat are prevented, so that operation sound decreases.

In order to obtain such sound/vibration suppression effect, formula (1) is satisfied. Also, since ones that malfunction were found among ones that satisfy formula (1), in order to eliminate them, formula (2) should also be satisfied. How formulas (1) and (2) have been derived will be described below.

From the Bernoulli's theorem $$\tfrac{1}{2}\rho v^2 + P + \rho g z = \text{constant}$$

ρ: fluid density  g: acceleration of gravity
p: fluid pressure  z: height from reference surface
v: absolute value of flow rate vector Assuming that ρ, g and z are constant, $$\Delta P = \rho v^2/2$$

On the other hand, the suction force acting on the poppet is:

$$F = \Delta P \cdot A_1 \, (A_1: \text{pressure receiving area of poppet})$$
$$= \rho v^2/2 \cdot A_1 = \rho(Q/A_2)^2 \cdot A_1/2$$
$$(Q: \text{flow rate}$$
$$A_2: \text{flow passage area})$$
$$= \rho Q^2/2 \cdot A_1/A_2^2$$

Here, considering that around the center of the poppet, the valve-opening force by hydraulic pressure is canceled by Bernoulli effect and assuming that the diameter of this range is B, $$A_1 = K_1(r^2 - B^2)$$

Supposing that $A_2$ is proportional to stroke St, $$A_2 = K_2 \cdot St$$

Ignoring changes in $\rho$ and Q, $$F = K \cdot (r^2 - B^2)/St^2$$

Here, if $F_{SP} < F$, it is possible to suppress sound and vibration by keeping the poppet in a half-open position. Thus, $$F_{SP} < K \cdot (r^2 - B^2)/St^2$$

Since the stroke is irrelevant to the sound/vibration suppression, $$F_{SP}/(r^2 - B^2) < K$$

Also, since malfunction of the solenoid valve will not occur if the spring force $F_{SP} > F$, $$F_{SP} > K \cdot (r^2 - B^2)/St^2$$
$$F_{SP} \cdot St^2/(r^2 - B^2) > K$$

Based on this thought, with a solenoid valve having the structure of FIG. 3 and having an orifice diameter d of 0.7 mm, a seat angle θ of the valve seat of 120°, a poppet tip diameter r of 1.2 to 1.8 mm, evaluation was made while changing the spring $F_{SP}$ and stroke St. As a result, ones that satisfy formula (1) are small in sound and vibration, and ones that satisfy both formulas (1) and (2) are free of malfunction, so that it was possible to confirm the effects achieved by satisfying both formulas (1) and (2).

Other features and objects of the present invention will become apparent from the following description made with reference to the accompanying drawings, in which:

DETAILED DESCRIPTION OF THE PREFERRED EMBODIMENT

Figure 1A:
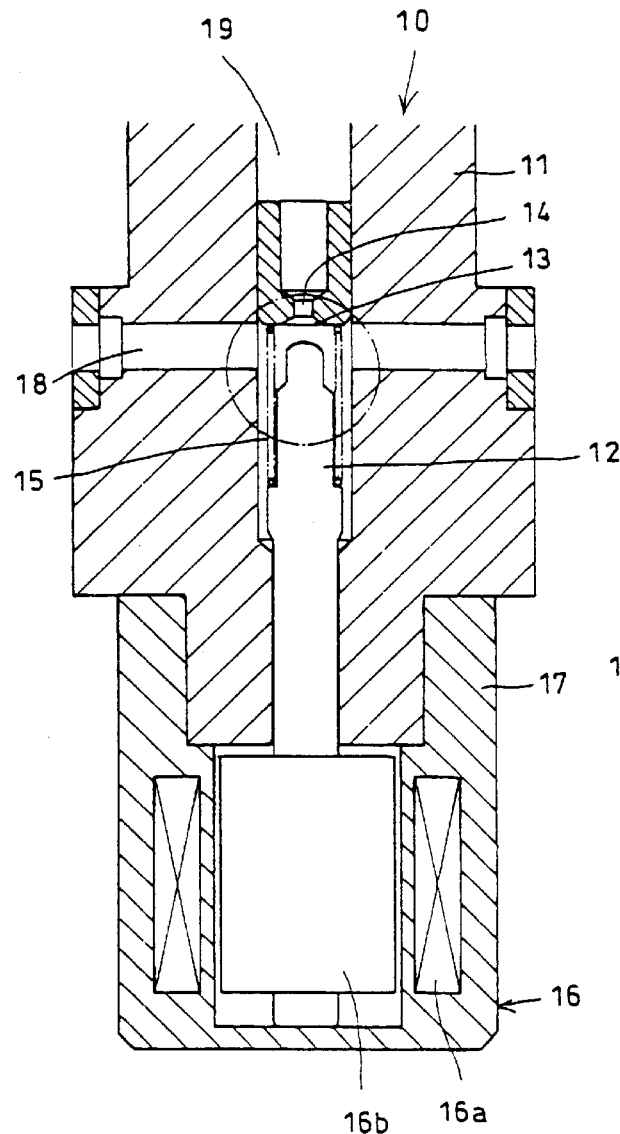
FIG. 1A is a sectional view showing an embodiment of the solenoid valve of this invention.
Figure 1B:
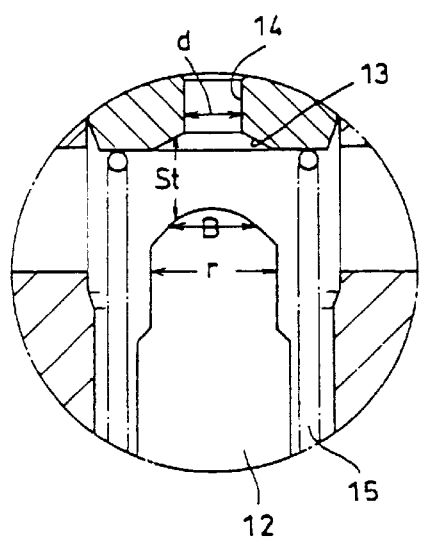
FIG. 1B is a partial sectional view of the same not in operation.
Figure 1C:
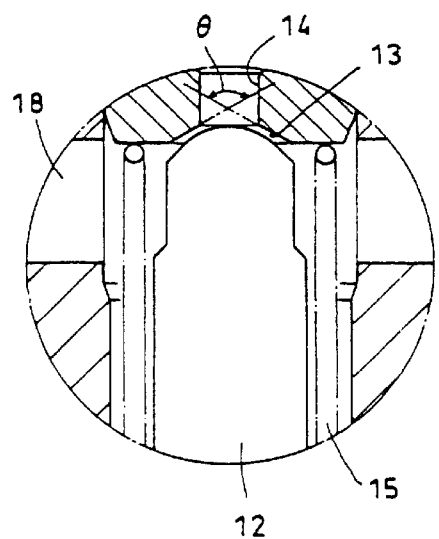
FIG. 1C is a partial sectional view of the same in operation for antilock control.

FIGS. 1A–1C show an embodiment of the solenoid valve embodying this invention. This solenoid valve 10 comprises a frame 11, a poppet 12 mounted in a bore of the frame 11, an orifice 14 having a valve seat 13, a spring 15 biasing the poppet 12 in a valve-opening direction, a solenoid 16 having a coil 16a and a movable core 16b for applying a valve-closing force to the poppet 12 by attracting the movable core 16b with a magnetic force produced by energizing the coil 16a, and a housing 17 coupled to the frame 11.

Figure 3:
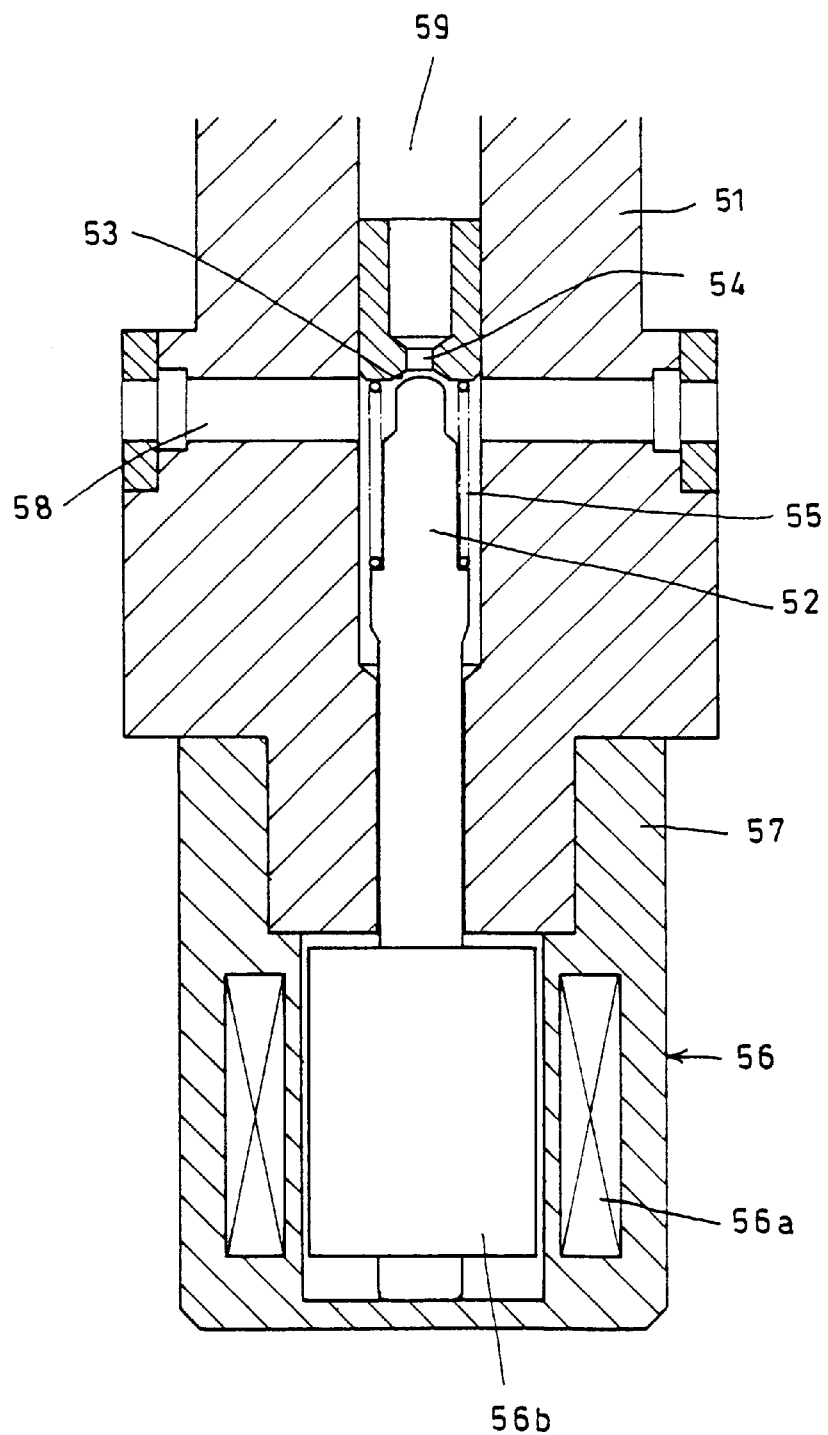
FIG. 3 is a sectional view showing a conventional solenoid valve used in the illustrated brake system of FIG. 2.

As is apparent from the figures, while it comprises the same elements as those in the conventional solenoid valve shown in FIG. 3, the tip diameter r of the poppet 12 shown in FIG. 1B is larger than that in FIG. 3, and the force of the spring 15 and the stroke St of the poppet 12 are set so as to satisfy the following formulas (1) and (2). It differs from the conventional valve in these points.

$$F_{SP}/(r^2 - B^2) < 67 \tag{1}$$

$$F_{SP} \cdot St^2/(r^2 - B^2) > 29 \tag{2}$$

The illustrated solenoid valve 10 has an orifice diameter d of 0.7 mm, tip diameter r of poppet of 1.2 to 1.8 mm and poppet stroke St of 1 mm, and B of 1.1 mm (about 1.57 times of d) so that the spring force $F_{SP}$ will satisfy both formulas (1) and (2).

The state of the solenoid valve 10 when not in operation is shown in FIG. 1B while the state when in operation is shown in FIG. 1C. During pressure reincrease in antilock control, brake fluid flows from an input port 19, which is at high pressure, to an output port 18 at which the pressure has dropped. Under suction force produced by the Bernoulli effect at this time, the poppet 12 is kept in a half-open position as shown in FIG. 1C, so that sound and vibration are suppressed. If the force of the spring 15 is too weak, even in an antilock non-operating state, the puppet 12 may be attracted to the valve seat 13 under a suction force by Bernoulli effect, causing malfunction (poor opening of the valve). But because the illustrated solenoid valve satisfies the formulas (1) and (2), the sound and vibration are suppressed and simultaneously malfunction is prevented.

B in the formulas (1) and (2) varies with the orifice diameter d and the seat angle θ of the valve seat 13.

Table 1 shows the results of evaluation tests on sound/vibration and malfunction conducted for specimens 1–19.

The specimens were all designed with the orifice diameter d of 0.7 mm and the seat angle θ of the valve seat (see FIG. 1C) of 120°.

The column X in Table 1 shows numerical values obtained by the formula $F_{SP}/(r^2 - B^2)$ when B=1.1 mm, whereas the column Y shows numerical values obtained by the formula $F_{SP} \cdot St^2/(r^2 - B^2)$ when B=1.1 mm.

Among the specimens, seven of them, i.e. Nos. 2, 7, 10, 11, 12, 13 and 19 satisfy both formulas (1) and (2). They showed both effects of suppressing sound/vibration and preventing malfunction. Three of them, i.e. specimen Nos. 2, 7 and 12 satisfy more preferable conditions of $F_{SP}/(r^2 - B^2) < 48$ and $F_{SP} \cdot St^2/(r^2 - B^2) > 40$. Thus, they showed better effects in suppressing sound/vibration and preventing malfunction.

Figure 2:
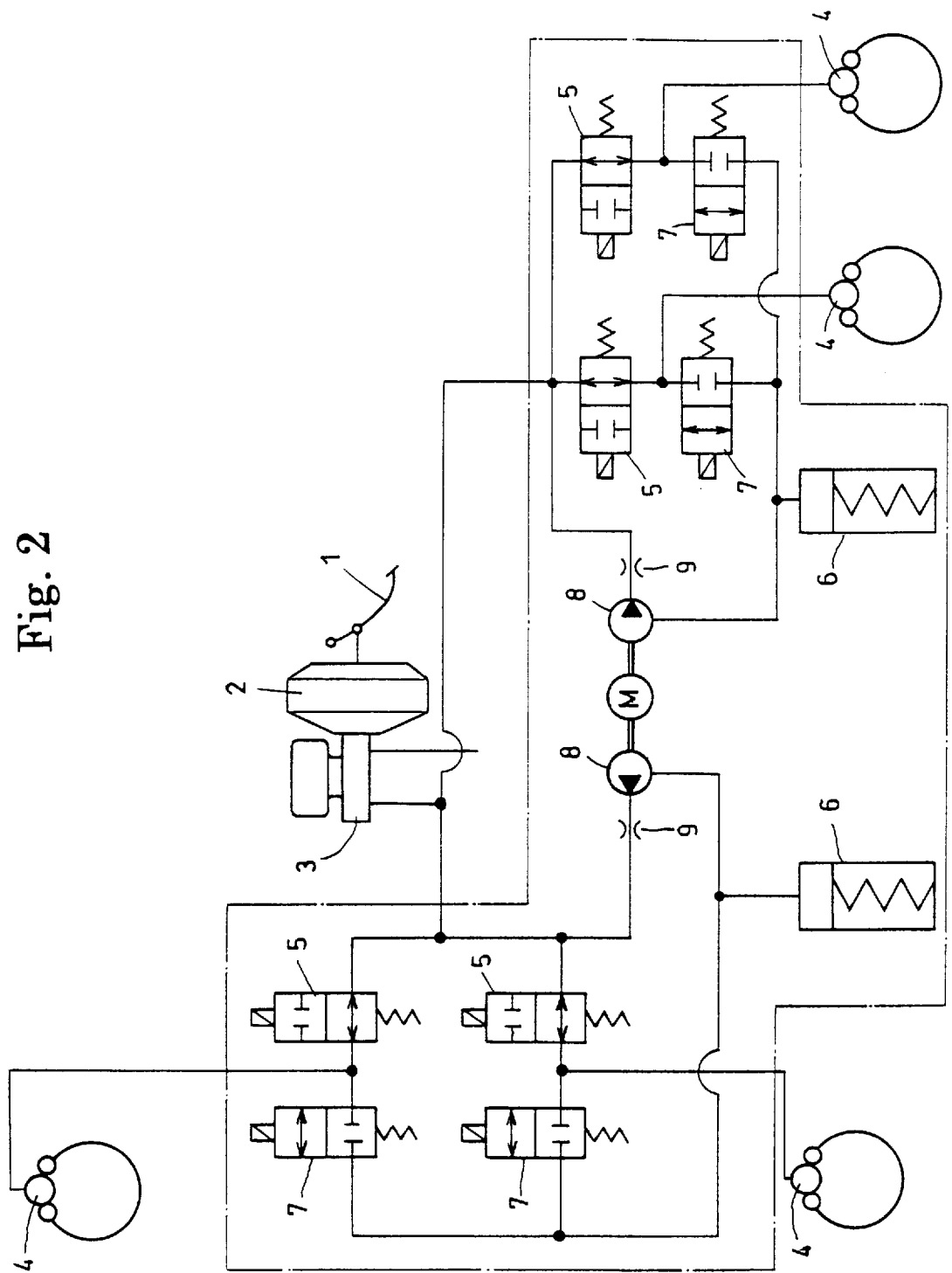
FIG. 2 is a circuit diagram showing one example of a vehicle hydraulic brake system in which the solenoid valve of this invention is employed.

For other specimens (in which specimen No. 4 is a conventional one used in the brake system of FIG. 2), one of suppressing sound/vibration and preventing malfunction is sacrificed.

The solenoid valve of this invention can be widely used for any other system than a vehicle hydraulic brake system as a solenoid valve for controlling the hydraulic pressure while repeating pressure increase and reduction.

With the solenoid valve of this invention, because the force of the spring biasing the poppet in a valve-opening direction is reduced so that the poppet is kept in a half-open position under the force by Bernoulli effect, sound/vibration is suppressed.

Also, because malfunction is eliminated by reducing the spring force so as to satisfy both the formulas (1) and (2), reliability is ensured. If it is employed in a vehicle hydraulic brake system for which quietness, comfortability and safety are required, especially large effects can be expected.

| Specimen | spring force $F_{SP}$(gf) | poppet tip diameter r(mm) | stroke St(mm) | sound/ vibration | malfunction | X | Y |
|---|---|---|---|---|---|---|---|
| 1 | 10(98.0665 × 10⁻³N) | 1.2 | 0.6 | ○ | X | 43 | 16 |
| 2 | 10(98.0665 × 10⁻³N) | 1.2 | 1.0 | ○ | ○ | 43 | 43 |
| 3 | 50(450.3225 × 10⁻³N) | 1.2 | 0.6 | X | ○ | 217 | 78 |
| 4 | 200(1801.2900 × 10⁻³N) | 1.2 | 0.25 | X | ○ | 870 | 54 |
| 5 | 10(98.0665 × 10⁻³N) | 1.4 | 0.25 | ⊚ | X | 13 | 1 |
| 6 | 30(274.1995 × 10⁻³N) | 1.4 | 0.6 | ○ | X | 40 | 14 |
| 7 | 30(274.1995 × 10⁻³N) | 1.4 | 1.0 | ○ | ○ | 40 | 40 |
| 8 | 70(686.4555 × 10⁻³N) | 1.4 | 0.6 | X | Δ | 93 | 34 |
| 9 | 10(98.0665 × 10⁻³N) | 1.5 | 1.0 | ⊚ | X | 10 | 10 |
| 10 | 30(274.1995 × 10⁻³N) | 1.5 | 1.0 | ○ | Δ | 29 | 29 |
| 11 | 50(450.3225 × 10⁻³N) | 1.5 | 0.8 | ○ | Δ | 48 | 31 |
| 12 | 50(450.3225 × 10⁻³N) | 1.5 | 1.0 | ○ | ○ | 48 | 48 |
| 13 | 70(686.4555 × 10⁻³N) | 1.5 | 0.8 | Δ | ○ | 67 | 43 |
| 14 | 100(980.665 × 10⁻³N) | 1.5 | 0.8 | X | ○ | 96 | 62 |
| 15 | 10(98.0665 × 10⁻³N) | 1.8 | 0.25 | ⊚ | X | 5 | 0 |
| 16 | 10(98.0665 × 10⁻³N) | 1.8 | 0.45 | ⊚ | X | 5 | 1 |
| 17 | 10(98.0665 × 10⁻³N) | 1.8 | 1.0 | ⊚ | X | 5 | 5 |
| 18 | 30(274.1995 × 10⁻³N) | 1.8 | 1.0 | ⊚ | X | 15 | 15 |
| 19 | 70(686.4555 × 10⁻³N) | 1.8 | 1.0 | ○ | Δ | 34 | 34 |

⊚ extremely good
○ good
Δ rather good
X bad

What is claimed is:

1. A solenoid valve comprising a poppet, an orifice, a valve seat provided at a mouth portion of said orifice, a solenoid for bringing the tip of said poppet into contact with said valve seat by applying a valve-closing force to said poppet, and a spring for applying a force in a valve-opening direction to said poppet, whereby a flow passage around said valve seat is opened and closed by said poppet and the fluid to be controlled is allowed to flow through the valve while the valve is open, characterized in that the following conditions are satisfied, $$F_{SP}/(r^2-B^2)<67 \quad (1)$$

$$F_{SP} \cdot St^2/(r^2-B^2)>29 \quad (2)$$

wherein $F_{SP}$ is the force of said spring, r is the tip diameter of the poppet, St is the stroke of the poppet, and B is the diameter of the area of said poppet where the valve-opening force by hydraulic pressure does not work on said poppet under the Bernoulli effect.

2. The solenoid valve as claimed in claim 1 wherein the following conditions $$F_{sp}/(r^2-B^2)<48$$

$$F_{sp} \cdot St^2/(r^2-B^2)>40$$

are satisfied.

3. A solenoid valve comprising a poppet, an orifice, a valve seat provided at a mouth portion of said orifice, a solenoid for bringing the tip of said poppet into contact with said valve seat by applying a valve-closing force to said poppet, and a spring for applying a force in a valve-opening direction to said poppet, whereby a flow passage around said valve seat is opened and closed by said poppet and the fluid to be controlled is allowed to flow through the valve while the valve is open, characterized in that the following conditions are satisfied, $$F_{SP}/(r^2-B^2)<67 \quad (1)$$

$$F_{SP} \cdot St^2/(r^2-B^2)>29 \quad (2)$$

wherein $F_{SP}$ is the force of said spring, r is the tip diameter of said poppet, St is the stroke of said poppet, and B is the diameter of the area of said poppet where the valve-opening force by hydraulic pressure does not work on said poppet under the Bernoulli effect, wherein the tip diameter of said poppet is 1.2 to 1.8 mm, the orifice diameter is 0.7 mm, the angle of the seat surface of said valve seat is 120 degrees, and B is 1.1 mm.

4. The solenoid valve as claimed in claim 3 wherein the following conditions $$F_{sp}/(r^2-B^2)<48$$

$$F_{sp} \cdot St^2/(r^2-B^2)>40$$

are satisfied.

* * * * *